(12) United States Patent
Brault

(10) Patent No.: US 7,080,137 B2
(45) Date of Patent: Jul. 18, 2006

(54) COMMUNICATION SYSTEM BETWEEN A PROGRAMMABLE LOGIC CONTROLLER SERVER AND A CLIENT MACHINE

(75) Inventor: Gilbert Brault, Vence (FR)

(73) Assignee: Schneider Automation, Valbonne (FR)

( * ) Notice: Subject to any disclaimer, the term of this patent is extended or adjusted under 35 U.S.C. 154(b) by 873 days.

(21) Appl. No.: 09/789,162

(22) Filed: Feb. 21, 2001

(65) Prior Publication Data
US 2002/0161827 A1  Oct. 31, 2002

(30) Foreign Application Priority Data
Feb. 21, 2000  (FR)  ................................ 00 02360

(51) Int. Cl.
*G06F 15/16* (2006.01)
(52) U.S. Cl. ............... 709/224; 709/201; 709/218; 709/223; 709/236
(58) Field of Classification Search ............ 709/203, 709/230, 223, 220, 225, 218, 236; 713/201, 713/186; 707/1, 6, 10
See application file for complete search history.

(56) References Cited

U.S. PATENT DOCUMENTS

| | | | | |
|---|---|---|---|---|
| 6,542,515 B1 * | 4/2003 | Kumar et al. | ............... | 370/463 |
| 6,587,884 B1 * | 7/2003 | Papadopoulos et al. | ..... | 709/230 |
| 6,624,388 B1 * | 9/2003 | Blankenship et al. | .... | 219/130.5 |
| 6,634,008 B1 * | 10/2003 | Dole | ............... | 716/1 |
| 6,643,691 B1 * | 11/2003 | Austin | ............... | 709/217 |
| 6,643,779 B1 * | 11/2003 | Leung et al. | ............... | 713/201 |
| 6,725,264 B1 * | 4/2004 | Christy | ............... | 709/225 |
| 6,763,343 B1 * | 7/2004 | Brooke et al. | ............... | 707/1 |
| 6,853,867 B1 * | 2/2005 | Klindt et al. | ............... | 700/83 |

OTHER PUBLICATIONS

Tilo Klesper, Automatsieren Feldbusse, vol. 47, No. 8, pp. 60, 62, 64 and 66-68, "Der Internet-Zugriff Aufs Lon. Weltweiter Zugriff Auf Die Sensorik Und Aktorik Von Automatisierungs-Projekten", Apr. 14, 1998.

Peter M. Corcoran, et al., IEEE on Consumer Electronics, vol. 43, No. 4, pp. 1063-1069, "Browser-Style Interfaces to a Home Automation Network", Nov. 1, 1997.

(Continued)

*Primary Examiner*—John Follansbee
*Assistant Examiner*—Mohammad A. Siddiqi
(74) *Attorney, Agent, or Firm*—Oblon, Spivak, McClelland, Maier & Neustadt, P.C.

(57) ABSTRACT

This invention relates to a communication system between a programmable logic controller (PLC) equipped with an HTTP server and a client machine (C) via a network (B), characterized in that it comprises, in the central processing unit (CPU) of this controller, a means (API 1*a*) for adding "group sheets" (M1, M2. . . ) in XML format, whereon elements or signals for watching or controlling the process automated by the application of the programmable logic controller are grouped, as well as a means (API 1*b*) for adding/deleting elements or signals on these sheets, by specifying the type thereof, a means (API 1*c*, API 1*d*) for reading or writing these elements, and a means (API 2*b*, API 2*c*, API 2*d*) for reading these sheets and for writing on these sheets upon a query from the HTTP server.

21 Claims, 3 Drawing Sheets

OTHER PUBLICATIONS

Figure 1:
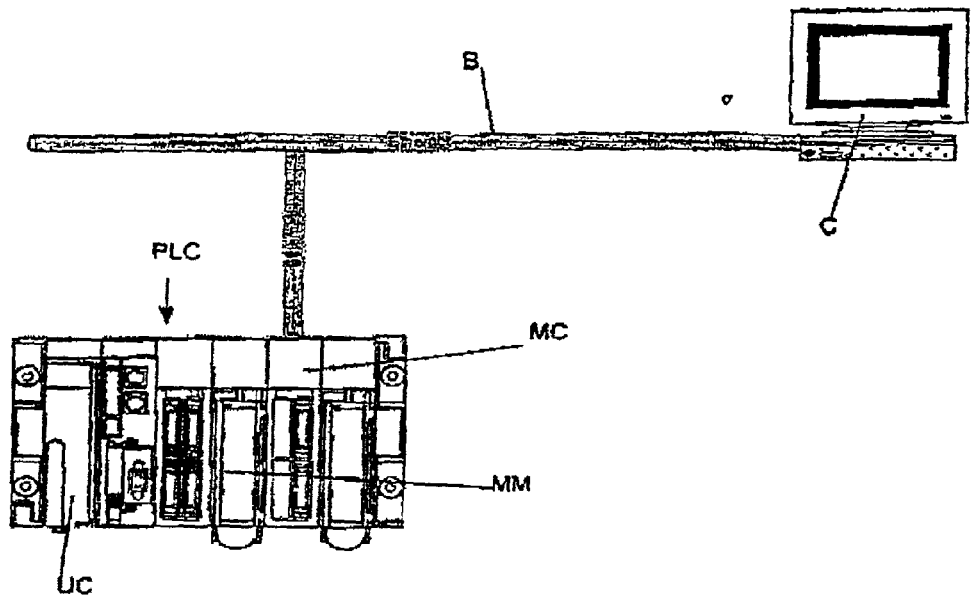

Thomas Ball, et al., IEEE Comp. Soc. Press, vol. Comf. 41, pp. 71-76, "An Internet Difference Engine and Its Applications", Feb. 25, 1996.

Raimund Mueller, Elektronik, vol. 40, No. 22, pp. 59-62, 64-65 and 68-69, "LON—Das Universelle Netzwerk", Oct. 29, 1991.

Raimund Mueller, Elektronik, pp. 75-76, 78, and 80-82, "LON—Das Universelle Netzwerk", 1991.

Steven A. Battle, et al. pp. 13/1-13/6, "Flexible Information Presentation with XML", Jan. 1999.

* cited by examiner

COMMUNICATION SYSTEM BETWEEN A PROGRAMMABLE LOGIC CONTROLLER SERVER AND A CLIENT MACHINE

The present invention relates to a communication system between a programmable logic controller server and a client machine, via an open network.

An open network is used for connecting data processing devices, such as personal computers and automation appliances for controlling an automated process, e.g. in an industrial production workshop or an intelligent building. Open networks based on TCP/IP technology are one example of an open network.

An industrial programmable logic controller is known, which is equipped in the signal processor with a query server that can be remote-polled via vendor-specific or standard protocols. This query server allows to read and write the objects processed by the application program of the programmable logic controller, i.e. application memory, organized in bits and words and controller status variables, system bits and words, input/output.

This arrangement ensures independence between controller applications and client applications. However, this method has certain drawbacks in as far as security and the use of controller and network resources are involved.

Lack of security appears in a heterogeneous network and is also the result of data sampling being asynchronous with respect to the controller cycle. A client station transmits several queries for watching a process. These queries can be served at different controller cycles, with the possibility that the signals watched have changed in the meantime. Therefore, there is a risk related to acquiring an erroneous status.

Regarding the use of resources, as the query server operates by answering questions from the client application, the latter has to repeat its question constantly (e.g.: "which is the value of a given memory bit"). This mechanism is resource intensive at the controllers central processing unit. Indeed, this central processing unit must permanently decode questions, which are always the same, in a given time. By way of example, the average time for decoding such a query is about 5 ms as an controller. This means that for obtaining the status of 5 non consecutive bits of the controller's address space, the central processing unit will use up 25 ms of the controller's cycle time (from 50 to 100 ms as an average) to provide this service. Moreover, this mechanism uses up network resources, as the client is constantly sending queries. The more the information is "split up" in the controller's "memory", the greater the number of queries will be and the longer the network will be busy. Finally, performance efficiency is bad. Indeed, the query "question" and the query "answer" for obtaining the status of one bit are coded on several bytes.

An industrial process is driven by applying guidelines and watching signal values, which will be called "interface signals" hereafter. By convention, the controller programmer can define, e.g. that a memory bit % M5 will represent the on-status of a machine, the bit value being 1 when the machine is on, or 0 when it is off. A convention like the one above, i.e. "bit % M5 represents the on-state of the machine" is used implicitly by programmers of client applications on the network. If the controller programmer wishes to change said controller variable, e.g. by allocating the representation of the machine on-state to bit % M6 instead of % M5, he must also make sure that the clients referencing this information change their definition, i.e. replace % M5 with % M6. In conclusion, in a controller, memory is freely available and there is no mechanism allowing the definition of interface signals (watching and guidelines) of the driven process to be shared in complete safety between the program of the programmable logic controller and the client applications of the network, as these signals have not been declared explicitly by the controller programmer.

The object of the present invention is to improve security by simultaneously carrying signal definition and value, thereby reducing the risk of signal misinterpretation. Also, signal acquisition is done synchronously with respect to the cycle of the programmable logic controller, thereby avoiding the generation of erroneous statuses and operational hazards. It allows a greater number of signals to be processed in comparison with the current solution, for a given hardware architecture. The processing unit has less processing to do at each cycle and the network is used wore efficiently.

The invention allows to add interfaces to the programming languages of the programmable logic controllers of various vendors (provided there is an HTTP server in their central processing unit) and thus allows these various programmable logic controllers to be brought to cooperate while having interface signal consistency.

The communication system according to the invention is characterized in that it comprises, in the central processing unit of this controller, a means for adding sheets (so-called "group sheets") in XML format, whereon elements or signals are grouped, which are to watch or control the process automated by the application of the programmable logic controller, as well as a means for adding or deleting elements on these sheets, by specifying their type, a means for reading and writing these elements, and a means for reading these sheets or for writing on these sheets upon a query from an HTTP server.

According to one feature, each of the elements or signals is in XML format and has a definition including the type of said signal and the binary value.

According to another feature, the system has a reading means, called complete reading means, generating an image of a "group sheet", which is a complete replica of the "group sheet" designated by the URL-address of DNS or TCP/IP type, the HTTP server port and the name of the "group sheet".

The present invention will now be described more in detail with reference to an illustrative embodiment represented in the appended drawings where;

FIG. 1 shows an open network architecture implementing the inventive method;

FISG. 2a and 2b are a block diagram of the programming interface or API in accordance with the invention.

The open network architecture illustrated in FIG. 1 has a programmable logic controller equipped with a central processing unit CPU, modules MM having an automation function, and a communication module MC with a server function. These modules and the central processing unit communicate via a private communication bus on the motherboard, This server controller PLC can be connected to other programmable logic controllers.

The central processing unit CPU of the programmable logic controller contains an application program written in a standard automation command language, "contact language", etc. . . . The operating system thereof manages input/output and internal variables, which are the variables of the controller program.

The communication module CM is of Ethernet type and allows this controller to be connected to a TCP/IP network. It is equipped with a central memory and a microprocessor, and can communicate, using the TCP/IP protocol and via a communication bus B, with a client machine C (a computer in this case) connected to the same network and equipped with an XML capable browser.

A programming interfaced called API ("Application Programming Interface") is stored in the central processing unit CPU and is an extension of the controller's operating system.

A "group sheet" (E1) is previously defined in XML format, with a tool compatible with the design software of the controller program, in order to group elements or "signals" of the automated process. The application programmer groups elements that are meaningful for watching or controlling the process automated by the automation application and which he wishes to make available with time consistency on the network (simultaneous sampling). Only the information he has defined on these sheets will be shared with client applications, i.e. client applications can gain access to this information only. The encoding scheme used is compliant with the XML standard of the W3C consortium.

By way of example, sheet E1 may have the following format:

```
<machine1>
    <machine_operating status dt:dt="bit", comment="machine 1 on", on="1", off="0", interface="output"/>
    <on_off dt:dt="bit", comment="on/off button machine 1", on="1", off="0", interface="input"/>
</machine1>
```

Interface API 1a allows to add, in a specific memory area of the programmable logic controller (called "group sheet" memory), a "group sheet" like M1 or M2 . . . grouping previously defined elements or "signals" of the automated process. Each of these previously defined elements represents a "signal" of the process and allows to ensure replication on the network. It is defined in XML format.

The "group sheets" stored (M1, M2, . . . ) may change in the course of time (addition or deletion of signals). By way of example, the sheet for adding an element has the following format:

```
<machine1>
    <time_counter dt:dt="string", comment="Number of operating hours", interface="output"/>
</machine1>
```

Interface API 1b allows to add/delete an element on a sheet, by specifying the type (binary, integer, floating, bit matrix, word, . . . , character string, . . . ).

Interface API 1c allows to read the value of an element in view of writing it into a controller variable of the same type, with a mechanism allowing to indicate whether the value of this element has changed with respect to the previous cycle of the controller program (HTTP write flags).

Interface API 1d allows to write a controller variable into an element and to set information in the structure "PLC write flags" in order to enable (complete or subscribed) write services to know when an update has to be made.

This programming interface supports a communication protocol allowing the sheets to be replicated with client applications running e.g. on client machine C. Information replication is done by sending signal value and definition (including type) simultaneously.

Interface API 2a strictly defines the rules for sampling replicated information, in synchronism with the controllers processing cycle. A client application therefore has an image of the information corresponding to a "photography" of the information status at the end of the controller cycle. The controller application also has a consistent image of the information written by client applications.

An HTTP server is installed in the central processing unit CPU of the programmable logic controller. A sheet is addressed via a URL indicating the (DNS or TCP/IP) address, the HTTP server port followed by the sheet name, The address thus appears in the form of http://<DNS or TCP/IP address>:port/<sheet name. When it is polled by a client appropriately encoding the URL (e.g., http://<DNS or TCP/IP address>:port/definition<sheet name), this HTTP server sends back the definition of the sheet and the elements thereof. Additional descriptive information (comments, . . . ) can be managed by an interface API 2e. By means of the HTTP protocol, interface API 2 allows for two read alternatives, one of which is called full read and the other one subscribed read. Moreover, it allows writing between the remote client and the controller server. The first read alternative called full read and performed by interface API 2b generates a "complete read sheet" (L1), which is a complete replica of the "group sheet" designated by the URL (<sheet name>, e.g. "machine1").

By way of example, L1 has the following format:
<machine1>
<machine_on dt:dt="bit">0</machine_on>
<on_off dt:dt="bit">0</on_off>
<time_counter dt:dt="string">"65 h35 min25 sec"<time_counter>
</machine 1>

This replicated sheet L1 has a definition of the signal, e.g. machine_on, data type "bit" and associated value 0 or 1.

The second read alternative called subscribed read and performed by interface APT 2d generates a sheet L2 grouping element modifications of a "group sheet", which happen between two successive server pollings. The prior subscription is performed by means of interface APT 2c.

By way of example, L2 has the following format:
<machine1>
<machine_on dt:dt="bit">0</machine_on>
</machine 1>

A replicated sheet L2 includes the signal definition, e.g. machine_on, type "bit", and associated value 0 or 1.

HTTP write queries are successively stored in the form of write sheets (E3) in XML format.

By way of example, a sheet E3 has the following format:
<machine1>
<on_off dt:dt="bit">1<on_off>
</machine 1>

This sheet E3 includes the definition of the signal and associated value 0 or 1.

Sheet writing, which is done via interface API 2a, is triggered by the controller application at the beginning of the cycle in order to update the sheets and their elements. It sets indicators (http write flags) enabling the controller program to test whether the value of an element has changed since the last processing cycle.

A replicated sheet (L1 or L2 and E3) includes the signal definition, e.g. machine_on, type dt:dt="bit", and associated value 0 or 1. Providing the information is done by the controller programmer who links an internal controller variable with the signal machine_on (writing an element API 1c and reading an element API 1d) It is then possible to modify said internal variable without having to inform all clients who only "see" the "external" signal machine_on.

Simultaneously carrying signal definition and value reduces the risk of signal misinterpretation.

Only the signals, which are explicitly declared as sheet elements (using interfaces API 1a and API 1b) are made available to the network. It is up to the programmer to decide how it is possible to interact with the process he is controlling by explicitly declaring interface signals.

The fact that signal acquisition is synchronous with the programmable logic controller's cycle avoids the replication of inconsistent information that could generate erroneous statuses and therefore operating hazards (interface API 1e). Signals are sampled according to the acquisition scheme input/processing/output restoral.

If something changes in the process, it is then made available to the outside. The central processing unit is used when required and also to provide more in-depth information on signals (definition, value), using XML encoding.

A client having a question of several bytes (e.g. an HTTP read query generating the reply L1 or L2) can find out about the complete status of the part of the machine it is interested in. Consequently, the load of the central processing unit is reduced and there is less processing to be done at each cycle. The network is used more efficiently due to the fact that is has more useful information in the same time unit in comparison with a known solution.

By means of the HTTP server, it is possible to generate sheets for defining group sheets (L3) in XML format which allow to learn about this interfaces, i.e. to understand the meaning of such signals (API 2e).

By way of example, a sheet L3 has the following format:
<machine1>
<machine_on dt:dt="bit">comment="machine 1 on", on="1", off="0", interface="output"/>
<on_off dt:dt="bit">comment=on/off button machine "1", on=1, off="0", interface="input"/>
<time_counter dt:dt="string">comment="Operating hour counter", interface="output"/>
</machine 1>

Optionally it is also possible, when the elements of these sheets are created, to add design comments, which will be helpful for the interpretation one is free to make of the interface signals in a controller's central processing unit during polling from a client station equipped with an XML capable browser.

Of course, and without departing from the scope of the invention, it is possible to imagine minor alternatives and developments and even to envisage using equivalent means.

Figure 2:
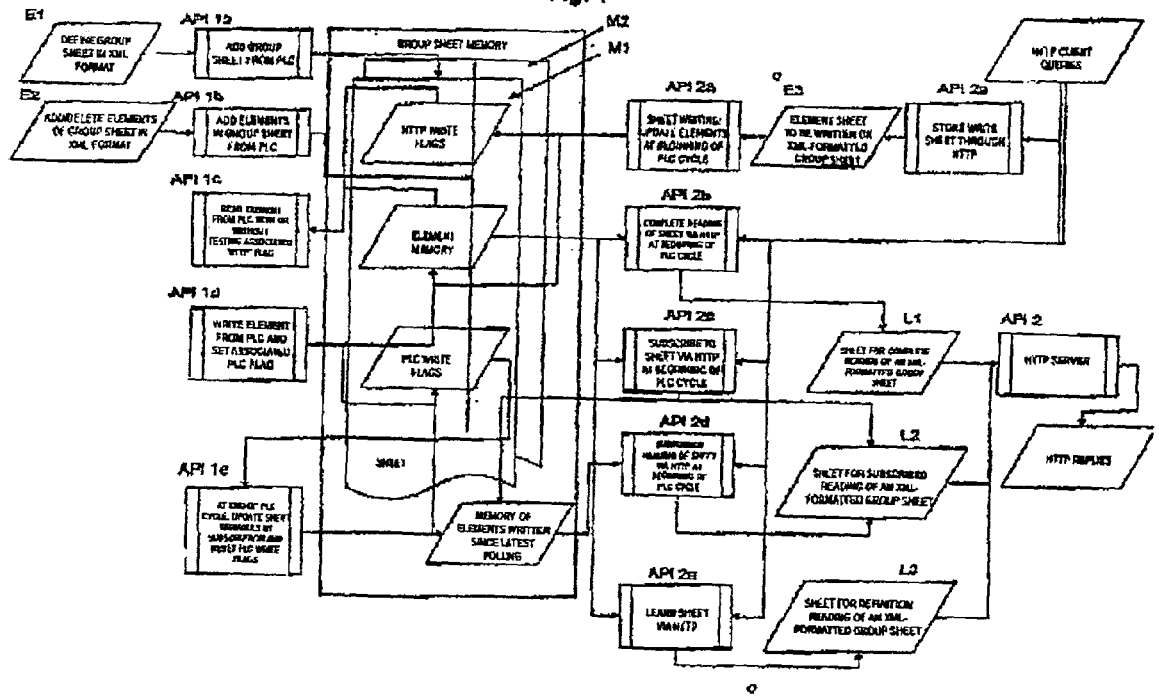
Figure 2A:
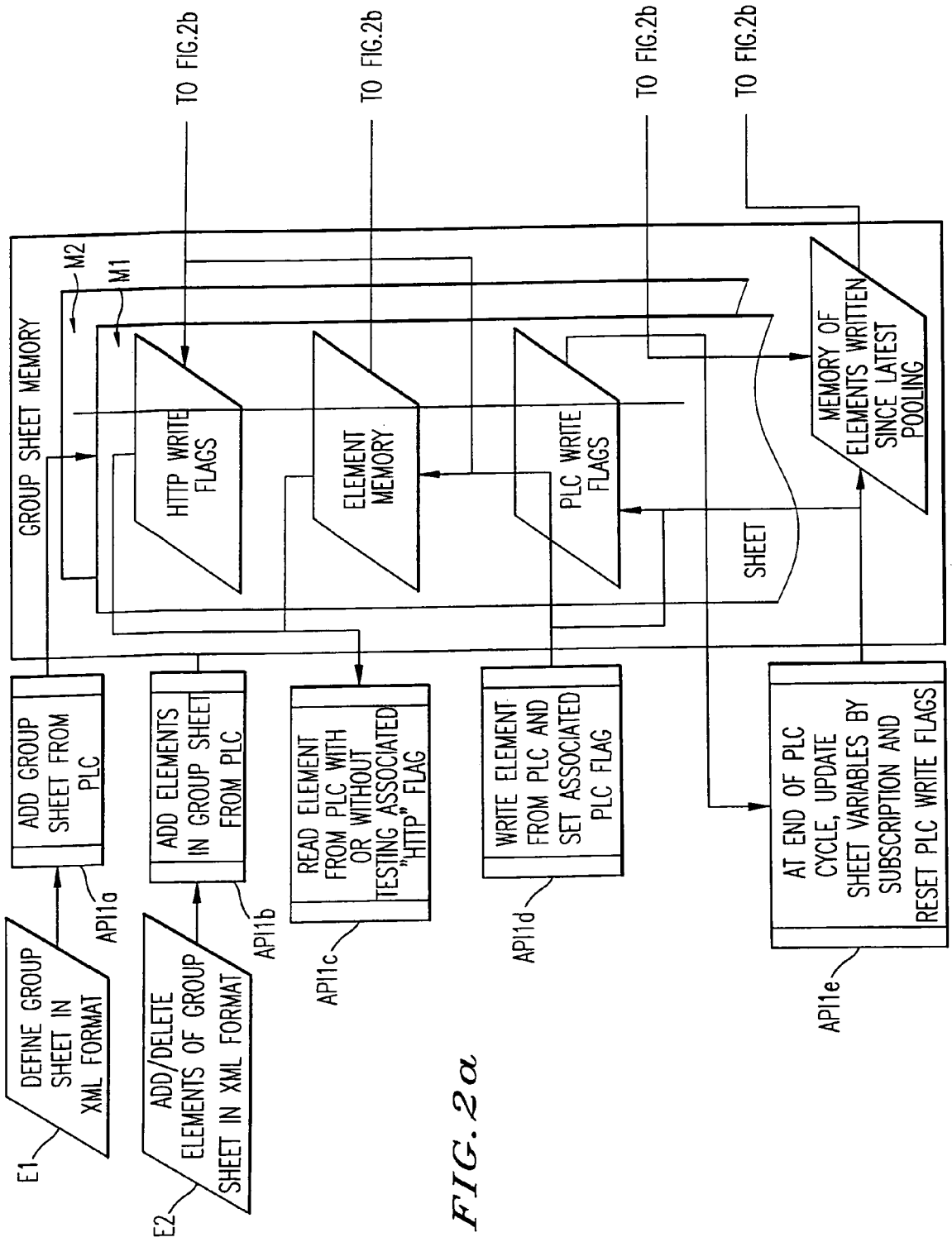
Figure 2B:
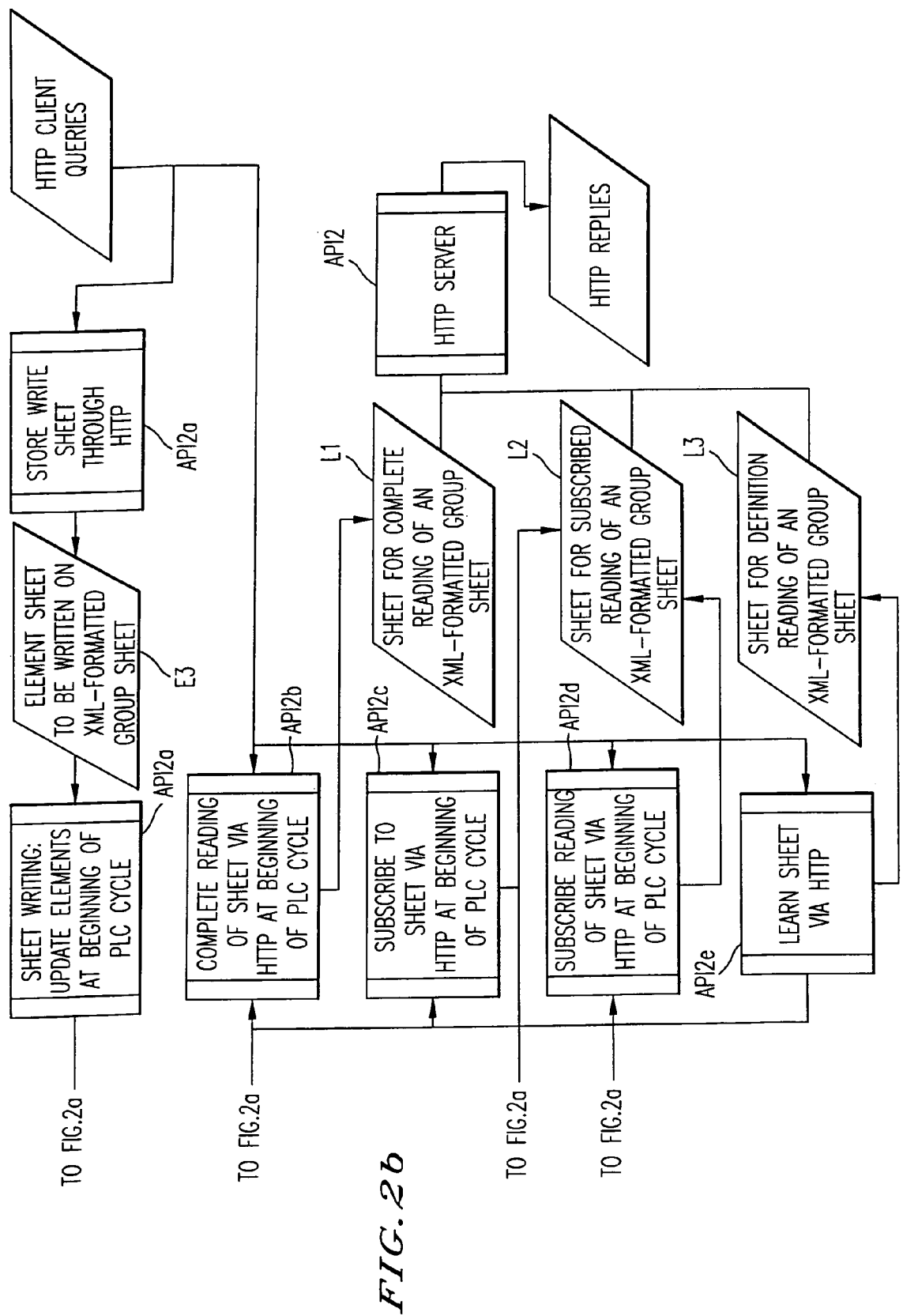

FIG. 2a
E1 DEFINE GROUP SHEET IN XML FORMAT
E2 ADD/DELETE ELEMENTS OF GROUP SHEET IN XML FORMAT
API1A ADD GROUP SHEET FROM PLC
API1B ADD ELEMENTS IN GROUP SHEET FROM PLC
API1C READ ELEMENT FROM PLC WITH OR WITHOUT TESTING ASSOCIATED "HTTP" FLAG
API1D WRITE ELEMENT FROM PLC ND SET ASSOCIATED PLC FLAG
API1E AT END OF PLC CYCLE, UPDATE SHEET VARIABLES BY SUBSCRIPTION AND RESET PLC WRITE FLAGS
M1/M2 GROUP SHEET MEMORY
HTTP WRITE FLAGS
ELEMENT MEMORY
PLC WRITE FLAGS
SHEET
MEMORY OF ELEMENTS WRITTEN SINCE LATEST POLLING
FIG. 2b
API 2a SHEET WRITING: UPDATE ELEMENTS AT BEGINNING OF PLC CYCLE
API 2b COMPLETE READING OF SHEET VIA HTTP AT BEGINNING OF PLC CYCLE
API 2c SUBSCRIBE TO SHEET VIA HTTP AT BEGINNING OF PLC CYCLE
API 2d SUBSCRIBED READING OF SHEET VIA HTTP AT BEGINNING OF PLC CYCLE
API 2e LEARN SHEET VIA HTTP
L1 SHEET FOR COMPLETE READING OF AN XML-FORMATTED GROUP SHEET
L2 SHEET FOR SUBSCRIBED READING OF AN XML-FORMATTED GROUP SHEET
L3 SHEET FOR DEFINITION READING OF AN XML-FORMATTED GROUP SHEET
E3 ELEMENT SHEET TO BE WRITTEN ON XML-FORMATTED GROUP SHEET
API 2aSTORE WRITE SHEET THROUGH HTTP
HTTP CLIENT QUERIES
API 2a STORE WRITE SHEET THROUGH HTTP
HTTP CLIENT QUERIES
API 2 HTTP SERVER
HTTP REPLIES

The invention claimed is:

1. A communication system between a programmable logic controller equipped with an HTTP server and client machine via a network, said system comprising:
group sheets in XML format including group elements or signals for watching or controlling a process automated by an application of the programmable logic controller;
means for reading from the programmable logic controller said elements or signals;
means for writing said elements or signals from the programmable logic controller on said group sheets;
means for reading said group sheets and for writing on said group sheets upon a query from the HTTP server, wherein the means for reading the group sheets and for writing on the group sheets includes means for generating a replicated sheet grounding the element modifications of a group sheet, said modifications taking place between two successive server pollings;
means for storing and creating write sheets in XML format, allowing said means for writing to change said elements or signals on said group sheets upon a query from the HTTP server; and
means for writing sheets in a controller cycle so as to update the sheets and associated elements,
wherein the programmable logic controller is configured to operate by cycles and further comprises a mechanism based on indicators signaling that said elements or signals have been changed by said means for writing on said group sheets upon a query from the HTTP server, thereby enabling the programmable logic controller to test whether a value of an element or signal has changed since a previous controller cycle.

2. The system according to claim 1, wherein each of said elements or signals in XML format includes a definition including a type of said elements or signals, as well as a value for each of said elements or signals.

3. The system according to claim 2, wherein the values of the elements or signals comprises binary values.

4. The system according to claim 1, wherein the replicated sheet is an image or a complete replica of a group sheet.

5. The system according to claim 1, further comprising subscription means.

6. The system according to claim 1, further comprising means for creating a definition sheet grouping additional descriptive information.

7. The system according to claim 1, further comprising means for adding group sheets.

8. The system according to claim 1, further comprising means for adding or deleting elements or signals on said group sheets.

9. The system according to claim 8, wherein said means for adding or deleting elements or signals on said group sheets add or delete said elements or signals by specifying the type thereof.

10. The system according to claim 9, wherein said type comprises at least one of a binary, an integer, a floating, a bit matrix, a word or a character string.

11. The system according to claim 8, wherein said means for adding or deleting group sheets add or delete said group sheets to or from the programmable logic controller memory.

12. The system according to claim 8, wherein said means for adding or deleting elements or signals on said group sheets is controlled from the programmable logic controller.

13. The system according to claim 1, wherein the group sheets are stored within the programmable logic controller.

14. The system according to claim 13, wherein the group sheets are stored in a specific memory area of the programmable logic controller.

15. The system according to claim 1, wherein said group sheets are designated by a URL address of DNS or TCP/IP type, a HTTP server port and the name of the group sheet.

16. The system according to claim 1, wherein said means for adding group sheets are controlled from the programmable logic controller.

17. The system according to claim 1, wherein the mechanism based on indicators also enables the means for reading the group sheets and for writing on the group sheets to know when an update has to be made.

18. An interface between a programmable logic controller and a HTTP server, said programmable logic controller comprising an application that automates a process, said interface comprising:

group sheets in XML format including group elements or signals for monitoring or controlling said process automated by said application of said programmable logic controller, said elements or signals storing values of controller variables;

means for reading said elements or signals on said group sheets from the programmable logic controller;

means for writing a controller variable into said elements or signals on said group sheets;

means for reading said group sheets and for writing on said group sheets upon a query by a client machine on the HTTP server, wherein the means for reading the group sheets and for writing on the ground sheets includes means for generating a replicated sheet grouping the element modifications of a group sheet, said modifications taking place between two successive server pollings;

means for storing and creating write sheets in XML format, allowing said means for writing to change said elements or signals on said group sheets upon a query from the HTTP server; and means for writing sheets in a controller cycle so as to update the sheets and associated elements, wherein the programmable logic controller is configured to operate by cycles and further comprises a mechanism based on indicators signaling that said elements or signals have been changed by said means for writing on said group sheets upon a query by said client machine on the HTTP server, thereby enabling the client machine to control the programmable logic controller, the programmable logic controller further configured to test whether a value of an element or signal has changed since a previous controller cycle.

19. The interface according to claim 18, wherein the mechanism based on indicators updates the controller variable, if said value has changed.

20. The interface according to claim 19, wherein a signal acquisition is done synchronously with respect to said cycle of said programmable logic controller.

21. The interface according to claim 18, wherein the mechanism based on indicators further enables writing services to know when an update as to be made.

* * * * *